UNITED STATES PATENT OFFICE.

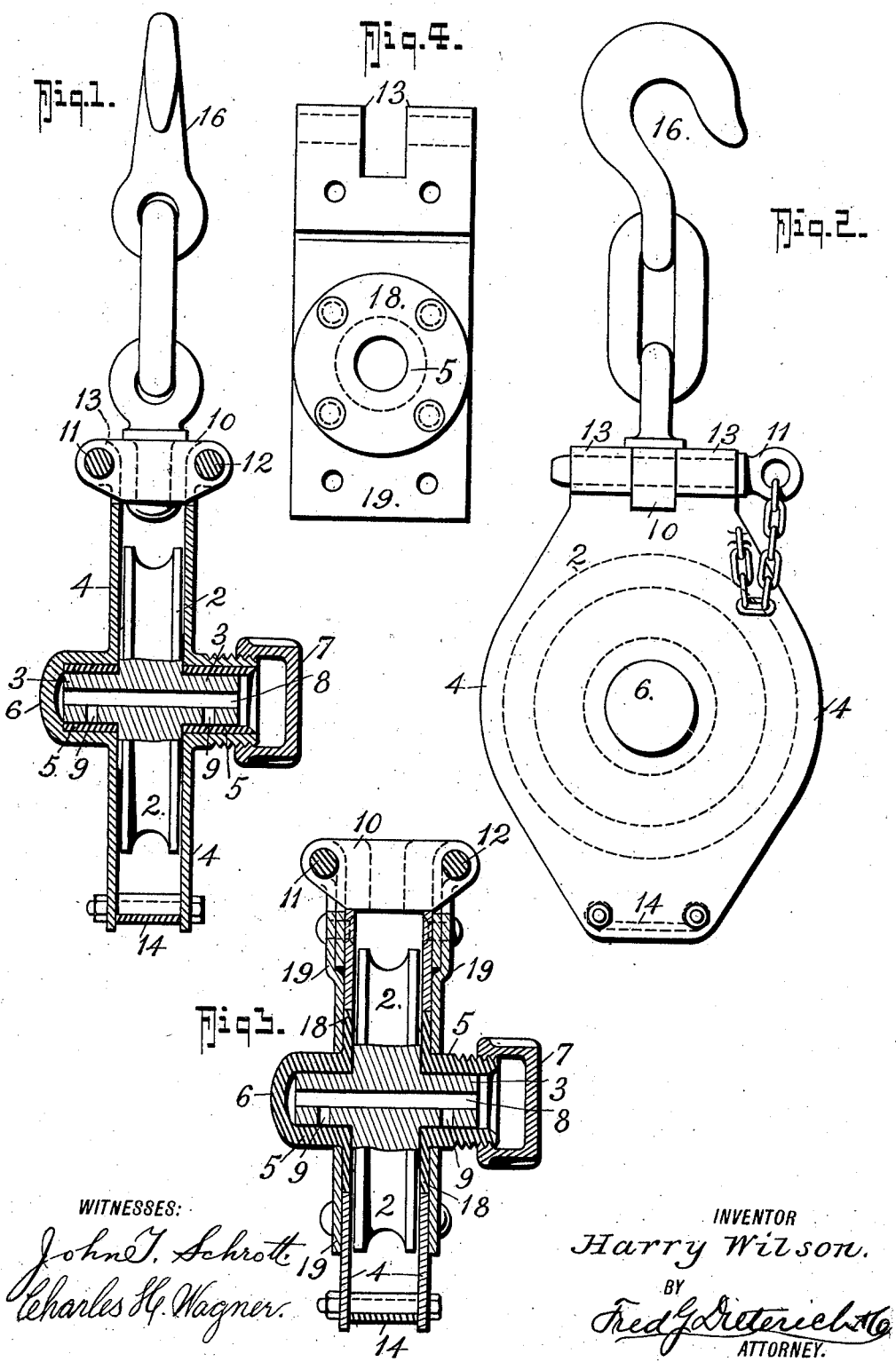

HARRY WILSON, OF VANCOUVER, BRITISH COLUMBIA, CANADA.

LOGGING SHEAVE-BLOCK.

984,987. Specification of Letters Patent. Patented Feb. 21, 1911.

Application filed January 26, 1910. Serial No. 540,294.

*To all whom it may concern:*

Be it known that I, HARRY WILSON, a citizen of Canada, residing at Vancouver, in the Province of British Columbia, Canada, have invented a new and useful Logging Sheave-Block, of which the following is a specification.

This invention relates to a logging sheave block particularly designed to prevent the intrusion of dust into the bearings of the sheave pin.

Sheave blocks used in logging operations frequently work on the surface of the ground and are consequently exposed to dust which, if it gets into the bearings, will rapidly destroy them. It is to provide a block having careful provision to prevent this, that the invention which is the subject of this application has been devised.

The block is particularly described in the following specification, reference being made to the drawings by which it is accompanied, in which:

Figure 1 is a longitudinal section through the block, Fig. 2, a side elevation of the same, and Figs. 3 and 4, a section and elevation of one of the side plates from the inside showing a modification of the construction adapted to the use of wrought steel instead of cast steel for the side plates.

In these drawings 2 represents a grooved sheave in which is secured a pin 3, or the pin may be integral with the sheave.

The side plates 4 of the block laterally project beyond the sheave and have bearings 5 for the pin which bearings are integral with the side plates as shown in Fig. 1 in which case they may be made of cast steel and bushed with brass or, as shown in Fig. 3, may be of brass and secured to the side plates. The ends of these bearings 5 are closed, that on one side, being cast with a closed end 6 and the other provided with a screw cap 7 threaded onto the outside of the bearing boss and forms a grease receptacle which may be tightened down from time to time to press the grease through a central drilled aperture 8 through the pin from which aperture two smaller ones 9 deliver the grease to the two bearings.

The side plates 4 are connected together at one end by a yoke 10 pin-connected at 11 and 12 to eyes 13 formed on the side plates 4 and at the opposite end are connected together by bolts with a distance piece 14. One of the pins 12 may be fixed in the plate and the other one 11 may be removable to enable the wire rope to be introduced in the groove of the sheave; this pin being connected by a short length of chain to the block.

The hook 16 and its connecting link are swivel connected in the yoke 10.

The modification shown in Figs. 3 and 4 shows the structural adaptation of the same design to the use of wrought steel side plates. In this adaptation the side plates 4 are bored to receive a flange 18 of the bearings 5 which bearings are by means of the flange riveted to a reinforcing plate 19 on each side the reinforcing plates being riveted to their respective side plates and are bent over as shown in Fig. 3 to form the eyes 13 for the attachment of the yoke 10.

A strong and serviceable sheave block is thus constructed the sheave pin bearings of which are efficiently protected against the intrusion of dust while provision is made for efficient lubrication and that in a manner that is not liable to injury in the rough usage to which such blocks are subjected.

Having now particularly described my invention I hereby declare that what I claim as new and desire to be protected in by Letters Patent, is.

1. A sheave block of the class described comprising a grooved sheave having an axial pin projecting from each side, side plates having bearing bosses bushed with bearings for the reception of the shaft pins, the boss on one side having a closed end and that on the other side having an open end, said open ended boss being externally threaded, a cap threaded on said threaded boss, said cap having a grease retaining chamber, said axial pin having a grease hole extending from end to end, and having grease holes for effecting communication between said end to end hole and the respective bearing surfaces of the respective bosses, said cap adapted to be screwed onto said threaded boss as conditions require to force the grease into said end to end hole, and means for connecting a hook to said block.

2. A sheave block of the class described comprising a grooved sheave having an axial pin projecting from each side, side plates having bearing bosses bushed with bearings for the reception of the shaft pins, the boss on one side having a closed end and that on the other side having an open end, said open ended boss being externally threaded, a cap threaded on said threaded boss, said cap having a grease retaining chamber, said axial pin having a grease hole extending from end to end, and having grease holes for effecting communication between said end to end hole and the respective bearing surfaces of the respective bosses, said cap adapted to be screwed onto said threaded boss as conditions require to force the grease into said end to end hole, means for connecting a hook to said block, said closed ended boss having its closed end spaced from the end of the adjacent axial pin portion to leave a grease receiving pocket portion at the corresponding end of said axial pin, substantially as shown and described.

3. A pulley block that comprises a pair of side plates and spacing members between said plates, and means for securing said plates and spacing members together, each of said side plates having an alining aperture, flanged bearing bosses projecting through apertures with their flanges lying against said side plates, means securing said side plates and flanges together, a sheave having a laterally projected bearing pin to enter said bosses, one of said bosses having one of its ends closed, the other boss being externally threaded, a grease holding cap threaded on said threaded boss, said bearing pin having grease passages leading to the bearing surfaces of said bosses, substantially as shown and described.

In testimony whereof I have signed my name to this specification in the presence of two subscribing witnesses.

HARRY WILSON.

Witnesses:
CECIL KILLAM,
A. L. P. HUNTER.